US006951492B2

(12) United States Patent
Gibbs

(10) Patent No.: US 6,951,492 B2
(45) Date of Patent: Oct. 4, 2005

(54) VEHICLE COOLING ARRANGEMENTS

(75) Inventor: Alan Timothy Gibbs, London (GB)

(73) Assignee: Gibbs Technologies Ltd. (GB)

( * ) Notice: Subject to any disclaimer, the term of this patent is extended or adjusted under 35 U.S.C. 154(b) by 0 days.

(21) Appl. No.: 10/469,257

(22) PCT Filed: Feb. 28, 2002

(86) PCT No.: PCT/GB02/00826

§ 371 (c)(1),
(2), (4) Date: Feb. 2, 2004

(87) PCT Pub. No.: WO02/070289

PCT Pub. Date: Sep. 12, 2002

(65) Prior Publication Data

US 2004/0110434 A1 Jun. 10, 2004

(30) Foreign Application Priority Data

Mar. 2, 2001 (GB) .............................................. 0105315

(51) Int. Cl.[7] .............................................. B63H 21/10
(52) U.S. Cl. .................................. 440/88 C; 440/12.5
(58) Field of Search .............................. 440/88 R, 88 C

(56) References Cited

U.S. PATENT DOCUMENTS 4,346,915 A    8/1982 LeBlanc
4,535,862 A    8/1985 LeBlanc
4,568,104 A    2/1986 LeBlanc
4,607,562 A    8/1986 LeBlanc
5,417,177 A    5/1995 Taguchi et al.

FOREIGN PATENT DOCUMENTS

FR    875897         10/1942
GB    2388184 A    * 11/2003    ............. F01P/3/20

* cited by examiner

Primary Examiner—Jesus D. Sotelo
(74) Attorney, Agent, or Firm—Calfee, Halter & Griswold LLP

(57) ABSTRACT

Engine (101) of an amphibious vehicle (100) is located in engine compartment (102). The engine is cooled by radiator (s) (103), mounted in cooling compartment (104), which is separate to compartment (102), and may be sealed off therefrom. Ram air effect or fans (105) (driven electrically, hydraulically, or mechanically) may be used to draw cooling air into compartment (104) through radiator (103), and out past exhaust silencer(s) (107) through opening (106). Coolant hoses (109) and exhaust pipes (111) may pass through apertures (108) and (110), sealed by rubber, or metal and rubber composite seals (112) and (113). Catalytic converters may be mounted in compartment (102) or compartment (104). Similarly, coolers for engine oil; transmission oil; oil for a marine propulsion power take off; and an intake air intercooler, may be mounted in either compartment. A further cooling system may be provided for compartment (102), with further cooling air ducts and fans.

16 Claims, 5 Drawing Sheets

VEHICLE COOLING ARRANGEMENTS

CROSS REFERENCE TO RELATED APPLICATIONS

The present application claims priority from International Application No. PCT/GB02/00826 with an international filing date of Feb. 28, 2002 which, in turn, claims priority from GB Patent Application No. 0105315.6, filed Mar. 2, 2001.

The present invention relates to cooling arrangements for an amphibious vehicle.

The design of road going vehicles has been refined over many years, so that most manufacturers have agreed on an optimised layout for the various major components, at least within classes of vehicles; e.g. passenger cars, or heavy goods vehicles. In each of these cases, the engine is usually mounted at the front of the vehicle, and is water cooled.

Manufacturers of amphibious vehicles may find it convenient and cost efficient to adapt automotive components from road going vehicles to their products. However, the different constraints of use on water must be factored into the design.

For example, the obvious location for an engine cooling radiator in a road going vehicle is at the front of the vehicle, where a flow of cooling air is easily obtained. Where the engine is front mounted, it is also easy to arrange coolant flow from the engine to the radiator, and vice versa. A cooling air opening is provided, whose area will typically be a compromise between air flow capacity on the one hand; and aerodynamic drag generated by air passage through said radiator, and the cooling duct leading therethrough, on the other hand. A cooling fan is provided; which is usually driven from the engine crankshaft where the engine is mounted along the main fore and aft axis of the vehicle; but is usually electrically driven where the engine is mounted transversely.

For an amphibious vehicle, however, different constraints apply. Three examples will now be given of prior art approaches to this problem, with reference to the accompanying FIGS. 1 to 4.

The French Hobbycar design (FIGS. 1 and 2) used a front mounted radiator 1, situated in a cooling duct 2 having an intake 3 and outlets 4 on each side of the vehicle. This arrangement allowed the use of air cooling of the radiator on land, and both air and water cooling of the radiator on water. It should be noted, however, that this arrangement is suited only to low speeds on water, for the following reasons. The radiator is exposed to mechanical damage, not only through collisions with foreign objects; but also because the matrix and finning of the radiator are designed only for air to pass over and through them respectively. Given the greater density of water relative to air, the passage of water through an automotive radiator at 15 knots (28 km/h) or more could cause collapse of the radiator structure. Also, the front mounting of the radiator in the Hobbycar necessitates long water pipes or hoses to connect the radiator to the centrally mounted engine.

Rorabaugh and Costa (U.S. Pat. No. 5,755,173) proposed an arrangement whereby the radiator is mounted in a spoiler mounted above the rear deck of an amphibious vehicle. This arrangement requires a spoiler to be included in the design of the vehicle, which may not be aesthetically acceptable; and as with the Hobbycar design, requires lengthy plumbing. It may be difficult to arrange a flow of cooling air through such a horizontally mounted radiator.

The Alvis Stormer military amphibious vehicle (FIGS. 3 and 4) used a front mounted radiator 5 mounted on a sloping forward deck 6, with a fan 8 mounted on an internal partition 7. Air was drawn through deck 6 and radiator 5, then through partition 7; and exhausted through deck 9 over engine 10. This arrangement suffers from the fan being mounted remotely from the radiator, which is inefficient. It will also be noted that the heat dissipated from radiator 5, along with that generated from engine 10 and exhaust system 11, will tend to provide an uncomfortably warm environment for the driver, seated at position 12 alongside engine 10. This may be acceptable in a military vehicle, but would not be acceptable in a vehicle aimed at the private leisure market.

The exhaust system of a road going vehicle is generally mounted underneath the vehicle, with a catalytic converter (where fitted) being mounted as close as possible to the exhaust manifold(s) to allow the fastest possible "light off", minimizing noxious emissions from a cold start. The catalytic converter is designed to run hot, but the rest of the exhaust system runs at cooler temperatures; so that the rearmost silencer is almost always the first to corrode in a road going vehicle, as it rarely reaches a high enough temperature to evaporate acidic water which collects therein.

As the exhaust system of a road going vehicle is slung underneath the car, it is effectively air cooled as the vehicle is driven, although instances have been known of catalytic converters overheating while vehicles idle in traffic jams.

For an amphibious vehicle, there are different constraints on the positioning of the exhaust. Clearly, the exhaust outlet(s) should be above the water line, to ensure that water is not sucked into the tailpipe, resulting in engine damage and immobilization of the vehicle. As the vehicle may be used in salt water, it is highly desirable that the exhaust system should be protected as far as is possible from water splashing over exhaust system components. It has been found, for example in the field of oil exploration, that corrosion is most fierce in its action in the "splash zone" where metal components are neither always submerged nor always in the air, but alternate between wet and dry conditions.

Another negative effect of water splashing over an exhaust system is that components of said system may be subjected to extremes of temperature and local quenching, resulting in cracking and premature failure of said components.

The Hobbycar exhaust silencer (13, FIG. 6) is located in a dedicated compartment to the rear of the vehicle (exit 14, FIG. 5). This is a good arrangement for a low speed amphibious vehicle, but raises concerns regarding the efficiency of exhaust cooling for a higher speed amphibian. As the surrounding body panels are made of composite plastic material, they may be damaged by a hot exhaust.

The Alvis Stormer was fitted with a side exit exhaust (FIG. 4). This arrangement is unsuitable for a present day design from a health and safety viewpoint, as exhaust gases would be directed from the vehicle towards pedestrians on adjacent pavement areas. Rorabaugh and Costa do not disclose an exhaust arrangement.

Water cooled exhausts are known for boats; but they are heavy, and will not work on land unless they carry additional coolant; which further increases weight.

An object of the invention is therefore to overcome the aforesaid disadvantages.

According to the invention, there is provided an amphibious vehicle having a central or rear mounted internal combustion engine to drive the vehicle, a coolant system to cool the engine including one or more radiators, and one or more juxtaposed engine exhaust silencers; where said radiator(s) and exhaust silencer(s) are mounted together in the centre or rear of the vehicle, in a cooling compartment separate to the engine compartment, the radiator and silencer being so arranged that air passing through the radiator is directed to pass subsequently past the silencer.

The advantage of the arrangement according to the invention is that engine heat is kept away from the driver and passenger areas; and that most water, often sea water, can be kept away from both the radiator(s) and exhaust silencer(s); and that air is passed efficiently through the radiator(s) to cool the exhaust silencer(s); enabling exhaust gases to be vented to the rear of the vehicle.

It is convenient to use a transversely front mounted power train from a typical family car to drive the front wheels of amphibious vehicles; particularly as the associated steering gear can also be conveniently used. Such a transplant, however, has drawbacks which will become evident from further consideration of the design and use of amphibians.

In order to achieve substantial penetration of the potential leisure market for amphibians, it is necessary to offer substantial speed on water. If the amphibian is capable of planing, where the vehicle rides substantially over the water, rather than through it; it may be capable of speeds on water of 15 knots (28 km/h) or more. For this purpose, the weight of the engine should be placed towards the rear of the vehicle to assist achievement of the tail down attitude on water which is necessary to commence and maintain planing.

However, if the engine is placed at the extreme tail of the vehicle, it may be difficult to package the engine accessories and marine drive in the restricted space available; and also to ensure that engine systems such as the combustion air intake, ignition system, and engine management system, are kept dry.

Front wheel drive power trains generally have driveshafts located behind the engine block. If such a power train is mounted behind a vehicle's rear wheels, in its original orientation, drive must be transferred from the driveshafts forward to the wheels, past the engine. This solution would be expensive and complex.

Alternatively, the power train could be reversed, with the transmission ahead of the engine; but additional gears would then be required to reverse the direction of rotation of the halfshafts. It is therefore convenient to mount the power train ahead of the rear axle. This also has a marketing advantage, as the vehicle can be marketed as a mid-engined sports car for road use. However, a rear mounted engine may be a viable alternative.

An embodiment of the invention will now be described with reference to the accompanying drawings, in which.

Figure 1:
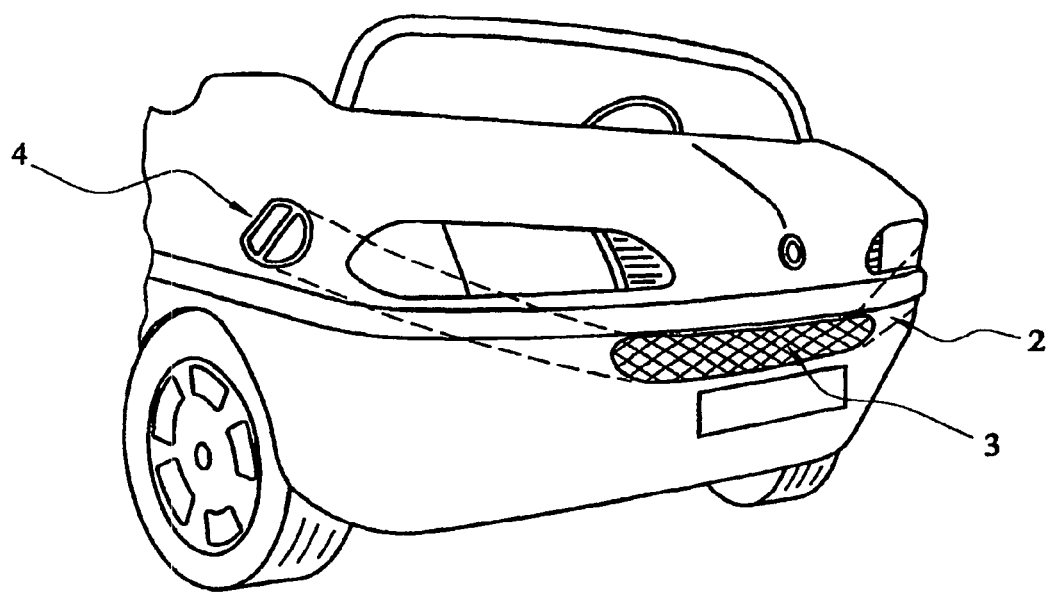
FIG. 1 is a perspective view of the front of the known "Hobbycar" amphibious vehicle.
Figure 2:
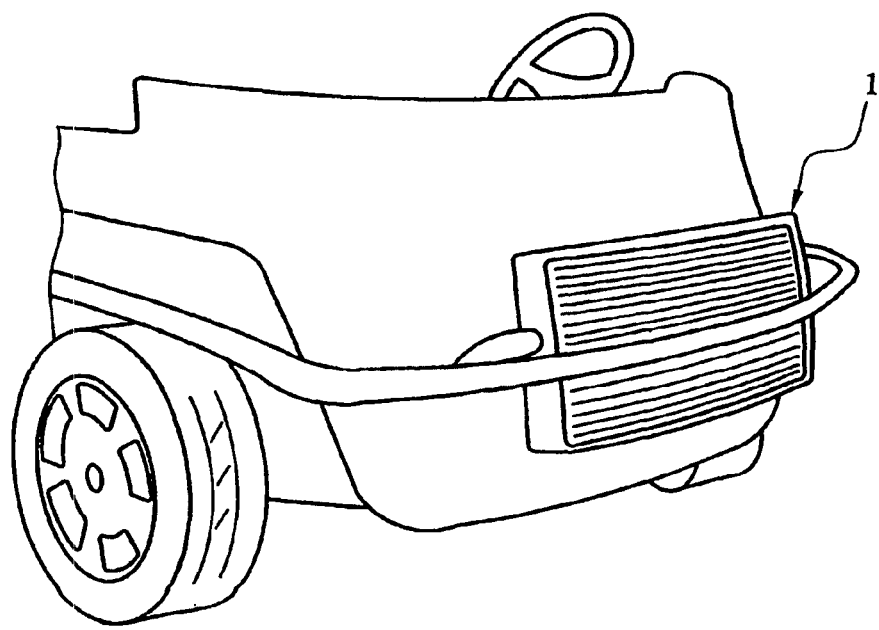
FIG. 2 is a similar view of the vehicle shown in FIG. 1, but without the outer bodywork.
Figure 3:
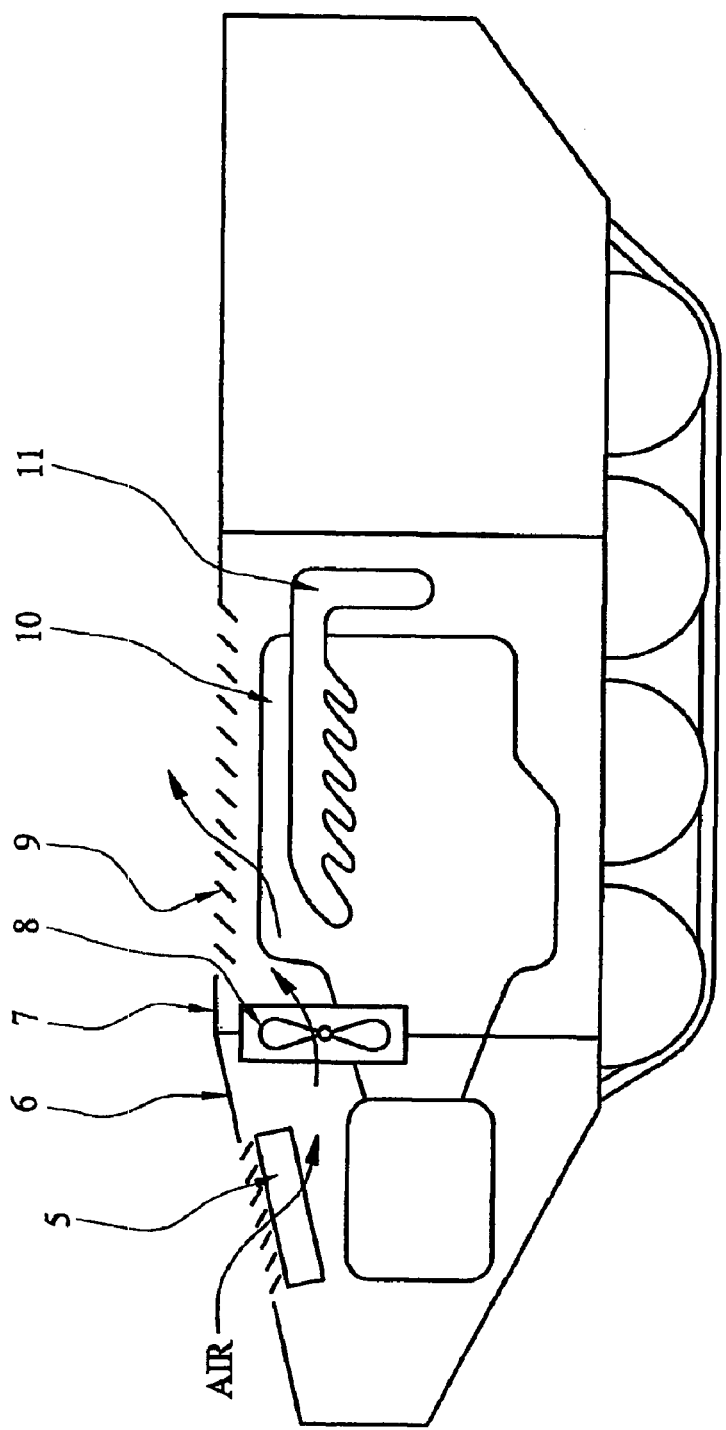
FIG. 3 is a diagrammatic sectional side view of the known Alvis Stormer amphibious vehicle.
Figure 4:
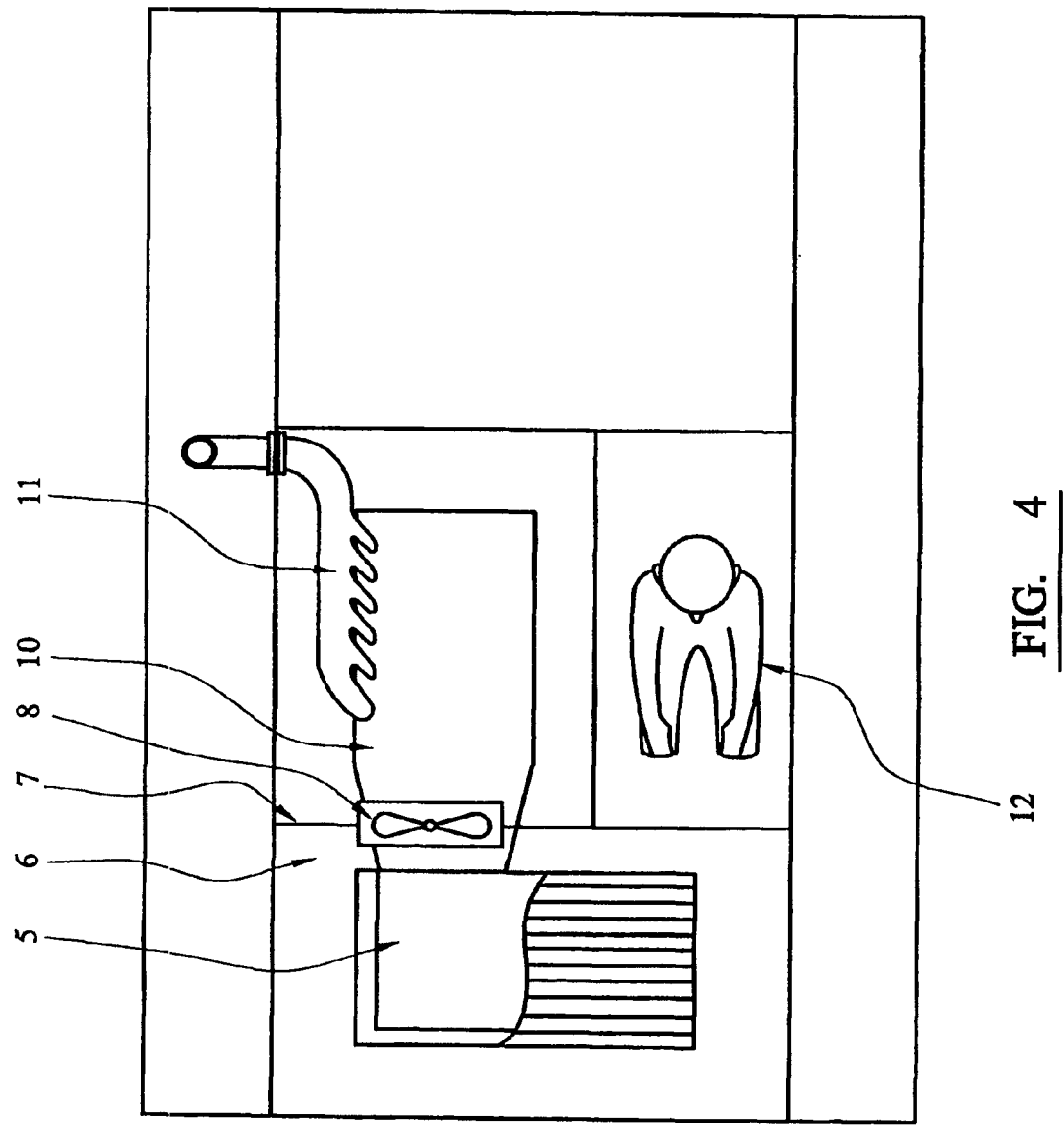
FIG. 4 is a diagrammatic sectional plan view of the vehicle of FIG. 3.
Figure 5:
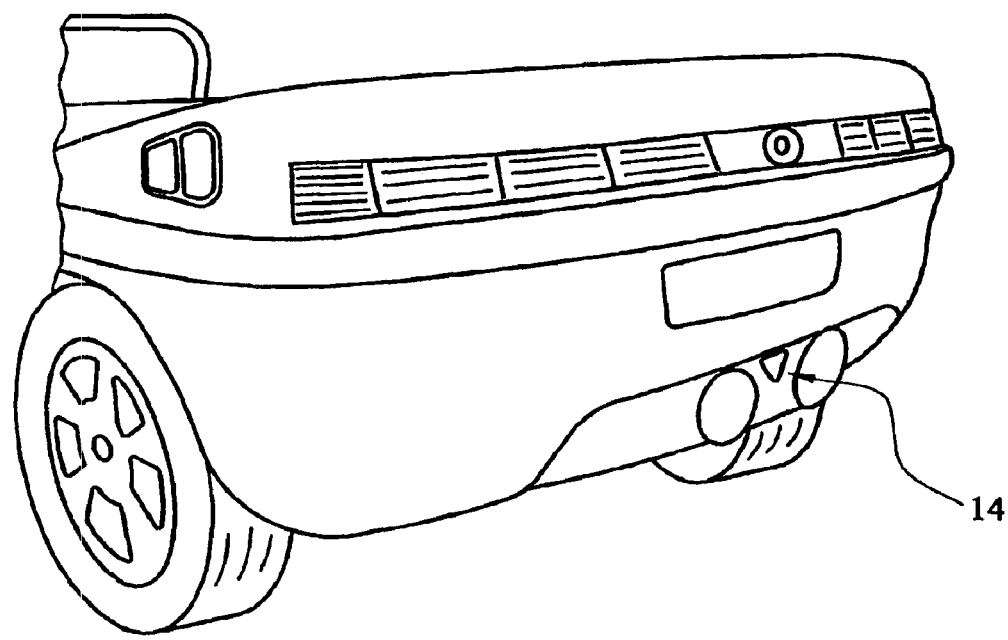
FIG. 5 is a perspective rear view of the vehicle of FIG. 1.
Figure 6:
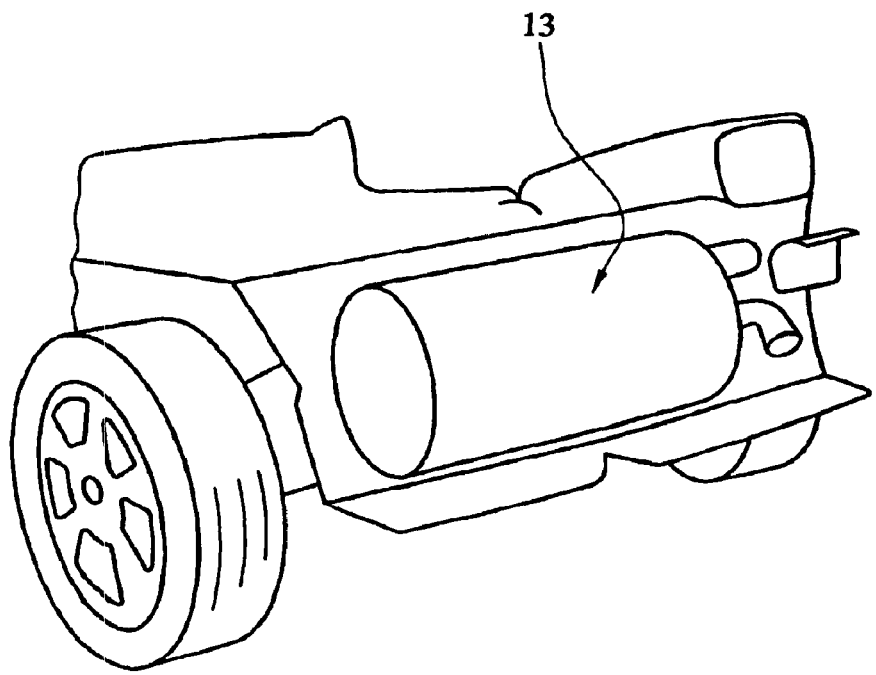
FIG. 6 is a perspective rear view of the vehicle of FIG. 1, without the outer bodywork; and, FIG. 7 is a diagrammatic sectional side view of the amphibious vehicle according to the invention.
Figure 7:
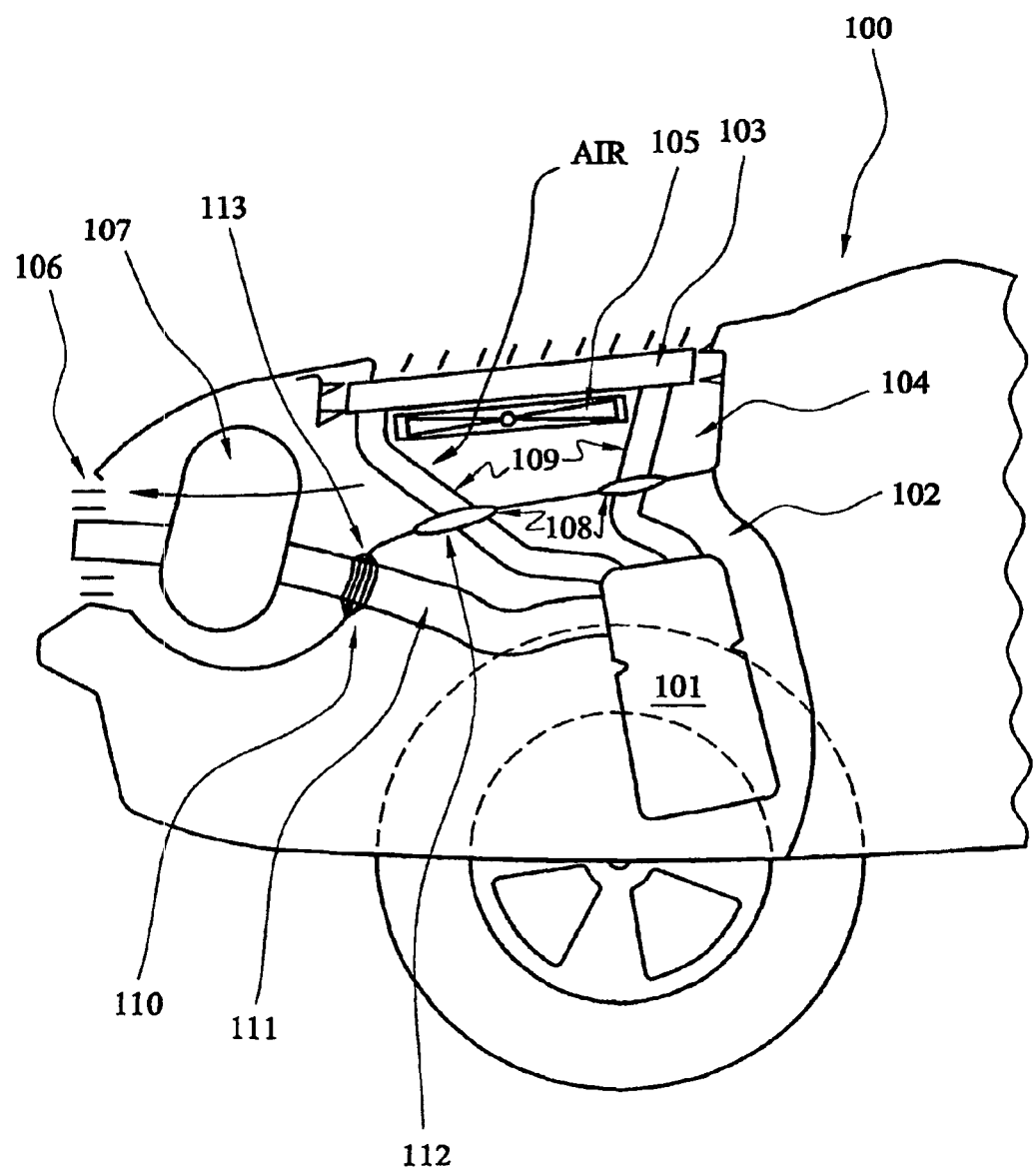

Referring to FIG. 7, engine 101 of amphibious vehicle 100 is located in an engine compartment 102. The engine is cooled by a radiator 103, which is mounted in a cooling compartment 104, which is separate to the engine compartment, and is sealed off therefrom. In this case, the vehicle is mid-engined, so the cooling compartment is located at the upper rear of the vehicle bodywork.

The radiator is cooled by one or more fans 105. The fan(s) may be driven electrically, hydraulically, or by mechanical drive means from the engine or elsewhere in the power train, as may be mechanically convenient. Cooling air is drawn into cooling compartment 104 through radiator 103 by said fan(s), and exhausted aft of the radiator through an opening 106. The cooling air passes over exhaust silencer(s) 107 on its way to opening 106, helping to cool the silencer on its way. Although this may appear illogical, it should be noted that the coolant temperature of the radiator is essentially limited to its boiling point under pressure of around 120 degrees Centigrade (248 degrees Fahrenheit). Beyond this point, the cooling system will become dysfunctional. By contrast, the exhaust system temperature has no such limitation. Hence even ambient air which has been heated by passage through the radiator may still be used to cool the exhaust. More than one coolant radiator and more than one exhaust silencer may be required within the cooling compartment, to provide sufficient cooling and exhaust silencing capacity respectively.

In order to protect the engine ignition system from ingress of water, the apertures 108 and 110 through which coolant hoses 109 and exhaust pipe(s) 111 respectively leave the engine compartment are sealed by metal and rubber composite seals 112 and 113. These are known from, for example, the Amphicar amphibious vehicle, and do not form part of the invention. As the temperatures of the coolant hoses 109 will be lower than those of exhaust pipe(s) 111, seals 112 may be made simply of rubber.

The mounting of radiator 103, fans 105, and exhaust silencer 107 are by means of conventional brackets and resilient mountings, already known in the automotive engineering art. These mountings do not specifically form part of the invention.

The engine catalytic converter(s) (not shown) should preferably be mounted within engine compartment 102. Catalytic converters are designed to run at high temperatures; both the converters themselves, and their electrical connections (e.g. for lambda sensors), should be kept away from water.

For a road going vehicle, engine compartment 102 will be open to the road below, allowing additional cooling of the engine block, transmission, catalytic converter, and any other mechanical and electronic components mounted in this area. The engine compartment of an amphibian vehicle, however, must be sealed below the engine; not only to stop the engine getting wet, but also to maintain buoyancy. The engine compartment may therefore require a further cooling system or systems, separate to that for the radiator and exhaust; which may comprise further cooling air ducts and fans. On the other hand, it may not be necessary to provide positive sealing around openings between engine compartment and cooling compartment as described above.

Although cooling fans are used in the preferred embodiment, if the engine is of low power rating, and the radiator is large, it may be possible to delete the fans; and to cool the radiator by natural passage of air over the radiator, known as "ram air".

In addition to the engine water cooling system, further cooling systems may be required in an amphibian, for engine oil, transmission oil, and power take off oil. (The power take off being used to drive a marine propulsion means, e.g. a jet drive.) Also, if the engine has forced induction, an intake air intercooler may be required to maintain the efficiency of the engine by cooling the intake air after it has passed through the supercharger, turbocharger, or other forced induction means. These further cooling systems may be located either in the engine compartment, or in the separate cooling compartment described above. The placement of these systems will be determined firstly by packaging requirements, and secondly by issues of heat management.

Many variations and modifications of the invention will be apparent to those skilled in the art from the above detailed description of the preferred embodiment. Therefore, it is to be understood that, within the scope of the appended claims, the invention can be practiced otherwise than as specifically shown and described.

What is claimed is:

1. An amphibious vehicle (100) having an internal combustion engine (101) to drive the vehicle, a cooling system to cool the engine including at least one radiator (103), and at least one juxtaposed engine exhaust silencer (107); wherein at least one of said radiator(s) and at least one of said exhaust silencer(s) are mounted together in a cooling compartment (104) separate to the engine compartment (102), the radiator and silencer being so arranged that air passing through the radiator is directed to pass subsequently past the silencer.

2. The amphibious vehicle (100) according to claim 1, wherein the cooling department (104) is sealed off from the engine compartment (102).

3. The amphibious vehicle (100) according to claim 1, wherein the cooling department (104) is located to the upper rear of the vehicle.

4. The amphibious vehicle (100) according to claim 1, wherein the coolant radiator (103) is arranged to be cooled by at least one electrically driven cooling fan (105).

5. The amphibious vehicle (100) according to claim 1, wherein the coolant radiator (103) is arranged to be cooled by at least one hydraulically driven cooling fan (105).

6. The amphibious vehicle (100) according to claim 1, wherein the coolant radiator (103) is arranged to be cooled by at least one mechanically driven cooling fan (105).

7. The amphibious vehicle (100) according to claim 1, wherein the coolant radiator (103) is arranged to be cooled by "ram air."

8. The amphibious vehicle (100) according to claim 1, wherein the engine is filled with at least one catalytic converter which is located in the engine compartment (102).

9. The amphibious vehicle (100) according to claim 1, wherein the engine is filled with at least one catalytic converter which is located in the cooling compartment (104).

10. The amphibious vehicle (100) according to claim 1, wherein at least one oil cooler is located within the engine compartment (102).

11. The amphibious vehicle (100) according to claim 1, wherein at least one oil cooler is located in the cooling compartment (104).

12. The amphibious vehicle (100) according to claim 1, wherein the engine compartment (102) is fitted with a separate cooling system in addition to that provided for the cooling compartment (104).

13. The amphibious vehicle (100) according to claim 1, wherein the engine is centrally mounted along the length of the vehicle.

14. The amphibious vehicle (100) according to claim 1, wherein the engine is mounted in the rear of the vehicle.

15. The amphibious vehicle (100) according to claim 1, wherein at least one cooler for the engine intake air is located within the engine compartment (102).

16. The amphibious vehicle (100) according to claim 1, wherein at least one cooler for the engine intake is located within the cooling compartment (104).

* * * * *